(12) United States Patent (10) Patent No.: US 6,653,757 B2
Schlenker (45) Date of Patent: Nov. 25, 2003

(54) PREPARATION OF PERMANENT MAGNET MOTOR SHAFT

(75) Inventor: Theodore R. Schlenker, Troy, MI (US)

(73) Assignee: Beaver Aerospace & Defense, Inc., Livonia, MI (US)

( * ) Notice: Subject to any disclaimer, the term of this patent is extended or adjusted under 35 U.S.C. 154(b) by 0 days.

(21) Appl. No.: 09/817,368

(22) Filed: Mar. 21, 2001

(65) Prior Publication Data

US 2002/0047428 A1 Apr. 25, 2002

Related U.S. Application Data

(60) Provisional application No. 60/200,421, filed on Apr. 28, 2000.

(51) Int. Cl.$^7$ ............................................. H02K 21/12
(52) U.S. Cl. ............................ 310/156.11; 310/156.01; 310/156.08
(58) Field of Search ....................... 310/156.11, 156.01, 310/156.18, 156.19, 156.21, 156.08, 156.14

(56) References Cited

U.S. PATENT DOCUMENTS 4,882,513 A * 11/1989 Flygare et al. .............. 310/114

FOREIGN PATENT DOCUMENTS

| JP | 03150030 | | 6/1991 | ............ H02K/1/27 |
|---|---|---|---|---|
| JP | 09219946 | | 8/1997 | ............ H02K/1/28 |
| JP | 409219946 | * | 8/1997 | ............ H02K/1/28 |
| JP | 2002101588 | * | 4/2002 | ............ H02K/1/28 |

* cited by examiner

*Primary Examiner*—Thanh Lam
(74) *Attorney, Agent, or Firm*—Raphael A. Monsanto; Benita J. Rohm

(57) ABSTRACT

A system for forming a precision shaft for a permanent magnet motor employs a working surface region of the precision shaft and a coaxially arranged rotor region. A cutting tool is used to make a first machining or cutting pass along the entire length of the working and rotor regions. Subsequent passes of the cutting tool are limited to the working region of the motor shaft to form a threaded ball screw shaft portion. The rotor region, however, remains with but a continuous shallow groove that is surrounded by a helical shaft portion having the original diameter of the precision shaft. Thus, preparation of the shaft to effect bonding of the magnetic rotor does not affect the shaft diameter. The depth of the shallow groove in the rotor region is approximately between 0.001" and 0.004", and preferably 0.003". The permanent magnet rotor is bonded to the rotor surface region of the precision shaft by an A+B heat cured type of epoxy.

3 Claims, 3 Drawing Sheets

PREPARATION OF PERMANENT MAGNET MOTOR SHAFT

CROSS REFERENCE TO RELATED APPLICATIONS

This application is a continuation of, and claims the benefit of, provisional application Ser. No. 60/200,421 filed on Apr. 28, 2000.

BACKGROUND OF THE INVENTION

1. Field of the Invention

This invention relates generally to armatures for high precision electric motors, and more particularly, to a motor shaft and method of preparing same for securing permanent rotor magnets thereto.

2. Description of the Related Art

High precision electric motors present difficulties in the attachment of permanent magnets that form the armature to the precision shafts. Usually, the shafts are finished with a smooth surface that will not permit adhesion of the permanent magnets. In addition, the precision shafts cannot tolerate conventional forms of surface preparation that would enhance the ability of the adhesive to form an effect of attachment. Any such surface preparation would change of the diameter of the shaft whereby it would be out of specification.

There is a need, therefore, for a method of preparing a shaft so that it can accept adhesion of the permanent magnets of the rotor without causing the diameter of the shaft to be out of predetermined tolerances.

A conventional precision motor shaft has a working portion and a rotor region. The working portion has a helical groove formed therein of multiple machining passes. Each such machining pass deepens the helical groove. In such known precision permanent magnet motors, the rotor region remains smoothly finished, causing the aforementioned difficulties in achieving adequate adhesion of the permanent magnets.

It is, therefore, an object of this invention to provide a shaft for a precision permanent magnet motor, the shaft having a rotor region that is finished to accept adhesion of permanent magnet motors, without the diameter of the shaft of being changed.

It is another object of this invention to provide a method of forming a shaft for a precision permanent magnet motor wherein the shaft is provided with a helical groove in a working region thereof, and a rotor region is simultaneously configured to enhance adhesion of permanent magnets.

SUMMARY OF THE INVENTION

The foregoing and other objects are achieved by this invention which provides, in a first method aspect thereof, a method of forming a precision shaft for a permanent magnet motor. This first method aspect of the invention includes the steps of:

first defining a working region of the precision shaft having an associated working surface region;

second defining a rotor region of the precision shaft having an associated rotor surface region, the rotor region of the precision shaft having a first predetermined cross-sectional diameter;

first preparing the working surface region of the precision shaft using a cutting tool, the step of first preparing including the further step of performing a first cutting pass by the cutting tool;

second preparing the rotor surface region of the precision shaft using the cutting tool, the step of second preparing including the step of continuing the first cutting pass by the cutting tool into the rotor surface region of the precision shaft; and third preparing the working region of the precision shaft using the cutting tool, the step of third preparing including at least a second cutting pass by the cutting tool into the working surface region of the precision shaft, wherein the steps of first preparing the working surface region of the precision shaft and second preparing the rotor surface region of the precision shaft include the step of forming a continuous helical cut along the working and rotor surface regions of the precision shaft, whereby an inter-helix region of the rotor surface region of the precision shaft retains the first predetermined cross-sectional diameter.

In a specific illustrative embodiment of this method aspect of the invention, there is provided the further step of forming a continuous helical cut along the working and rotor surface regions of the precision shaft is performed at a depth of approximately between 0.001" and 0.004" into the rotor surface region. Preferably, the continuous helical cut along the working and rotor surface regions of the precision shaft is performed at a depth of approximately 0.003" into the rotor surface region. The step of forming a continuous helical cut along the working and rotor surface regions of the precision shaft, in this specific illustrative embodiment of the invention, is performed using a cutting tool having a radius of approximately 0.020".

Once the continuous helical cut along the working and rotor surface regions of the precision shaft, there may be provided a plurality of further continuous helical cuts, in the form of machining passes, only in the working surface region of the precision shaft.

In this specific illustrative embodiment of the invention, once the working surface region has been cut to form the desired depth of continuous helical cut, there is further provided the step of installing a permanent magnet onto the rotor surface region of the precision shaft. This step can be performed using epoxy as an adhesive. In a highly advantageous embodiment, the epoxy is an A+B heat cured type of epoxy, and preferably conforms to specification MMM-A-132.

In accordance with an apparatus aspect of the invention, there is provided a rotor for a permanent magnet motor, the motor having a rotor. In accordance with the invention, the rotor has a rotor shaft that is provided with a working region for delivering mechanical energy, and a rotor region that is arranged coaxially with the working region, the rotor region having a rotor region surface having a rotor region surface cut therein. In addition, there is provided a permanent magnet arrangement coupled by an adhesive to the rotor region of the rotor shaft for facilitating conversion of electromagnetic energy to mechanical energy. The adhesion between the permanent magnet arrangement and the rotor region surface is enhanced by the rotor region surface cut.

As noted, the rotor region surface cut is a continuation of a working surface region cut, the working region of the rotor shaft having a threaded potion. As such, therefore, the working region surface cut is a first cut pass of the threaded portion of the working region of the rotor shaft.

In accordance with a process aspect of the invention, a rotor shaft for a permanent magnet motor formed by the process of:

first preparing a working surface region of a precision shaft using a cutting tool, the step of first preparing including the further step of performing a first cutting pass by the cutting tool;

second preparing a rotor surface region of the precision shaft using the cutting tool, the rotor surface region having a first predetermined cross-sectional diameter, the step of second preparing including the step of continuing a first cutting pass by the cutting tool into the rotor surface region of the precision shaft, the step of continuing a first cutting pass by the cutting tool forming a continuous helical cut along the working and rotor surface regions of the precision shaft, whereby an inter-helical cut region of the rotor surface region of the precision shaft retains the first predetermined cross-sectional diameter;

preparing the working region of the precision shaft using the cutting tool, the step of third preparing including at least a second cutting pass by the cutting tool into the working surface region of the precision shaft; and installing a permanent magnet onto the rotor surface region of the precision shaft by use of an adhesive, whereby the installed permanent magnet on the rotor surface region of the precision shaft forms the rotor shaft of the permanent magnet motor.

BRIEF DESCRIPTION OF THE DRAWING

Comprehension of the invention is facilitated by reading the following detailed description, in conjunction with the annexed drawing, in which.

DETAILED DESCRIPTION

Figure 1:
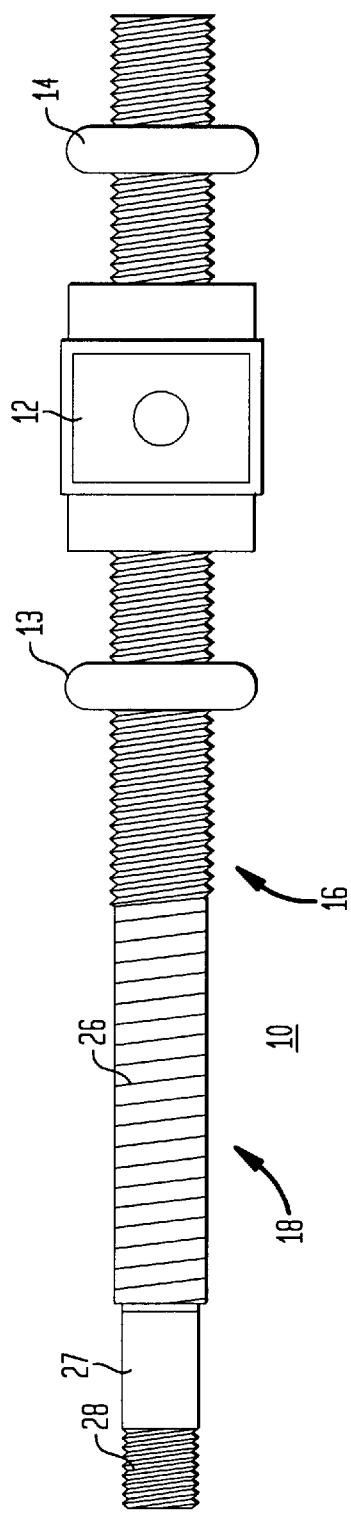
FIG. 1 is a simplified plan representation of a motor shaft constructed in accordance with the principles of the invention showing a rotor surface region having a ball screw nut and restrainer.

FIG. 1 is a simplified plan representation of a motor shaft 10 constructed in accordance with the principles of the invention showing a rotor surface region having a ball screw nut 12 and restrainers 13 and 14. The ball screw nut and the restrainers are installed on a working region 16 of motor shaft 10. There is additionally shown in this figure that working region 16 of motor shaft 10 is coaxially arranged with a rotor region 18 on which, as will be described below, will be installed a permanent magnet rotor (not shown in this figure).

In operation, as motor shaft 10 is rotated, ball screw nut 12 is urged axially therealong within the limits of translation set by restrainers 13 and 14. In this specific illustrative embodiment of the invention, therefore, the rotary motion of motor shaft 10 is translated to axial displacement of ball screw nut 12.

Figure 2B:
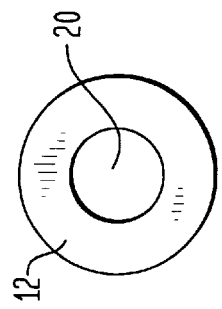
FIG. 2B is a plan end view of the ball nut shown in FIG. 1.
Figure 2A:
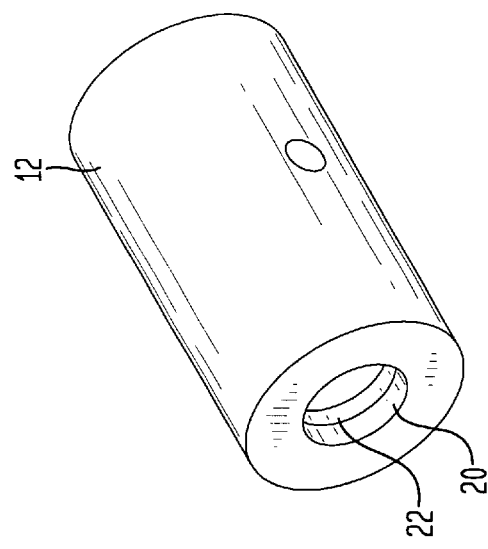
FIG. 2A is an isometric representation of the ball screw nut shown in FIG. 1.

FIG. 2A is an isometric representation of the ball screw nut 12 shown in FIG. 1. This particular ball screw nut has a cylindrical configuration with a bore 20 therethrough. FIG. 2B is an end view of ball screw nut 12 shown in FIG. 2A. The ball screw nut is shown to have internal threads 22 which, in combination with other internal structure (not shown), permit ball screw functionality. Persons of skill in the art can configure ball screw nut 12 to achieve such ball screw functionality, or acquire same commercially.

Referring again to FIG. 1, rotor region 18 of motor shaft 10 has machined or otherwise cut therein a continuous helical groove 26. As will be described in detail hereinbelow with respect to FIG. 3, the helical groove is a continuation of a first machining pass in the formation of the helical groove of working region 16. The rotor region of the motor shaft of the present embodiment additionally has a bearing region 27 on which a bearing (not shown) is installed, and a threaded portion 28.

Figure 3:
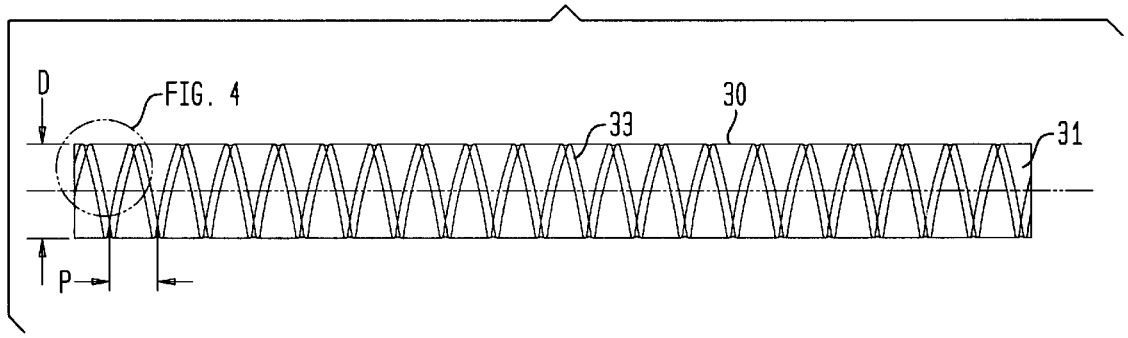
FIG. 3 is a simplified representation of a rotor surface region of a shaft that has been prepared in accordance with the invention so as to be suitable for adhering a permanent magnet rotor thereto without changing the diameter of the shaft.
Figure 4:
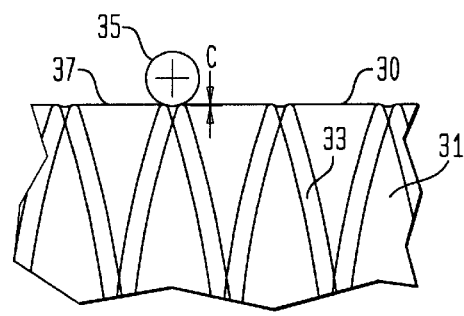
FIG. 4 is an expanded representation of a portion of FIG. 3.

FIG. 3 is a simplified representation of a portion of a specific illustrative embodiment of a rotor surface region 30 of a motor shaft 31 that has been prepared in accordance with the invention so as to be suitable for adhering a permanent magnet rotor (not shown in this figure) thereto without changing the diameter of the shaft. FIG. 4 is an enlarged representation of the designated region of FIG. 3. As shown in FIG. 3, there is provided a continuous helical groove 33 having a helical pitch P in this specific illustrative embodiment of 0.10" per turn. Also in this specific illustrative embodiment of the invention, motor shaft 31 has a diameter D of approximately 0.1870".

FIG. 4 shows continuous helical groove 33 to be formed in this specific illustrative embodiment using a cutter tool 35 having a radius of approximately 0.020". Cutter tool 35 is represented schematically in this figure and cuts, in this embodiment, to a cutting depth C of approximately between 0.001" and 0.004", and preferably approximately 0.003". It is important to note that continuous helical groove 33 is surrounded by helical shaft portion 37 which retains the original diameter of the shaft.

Figure 5:
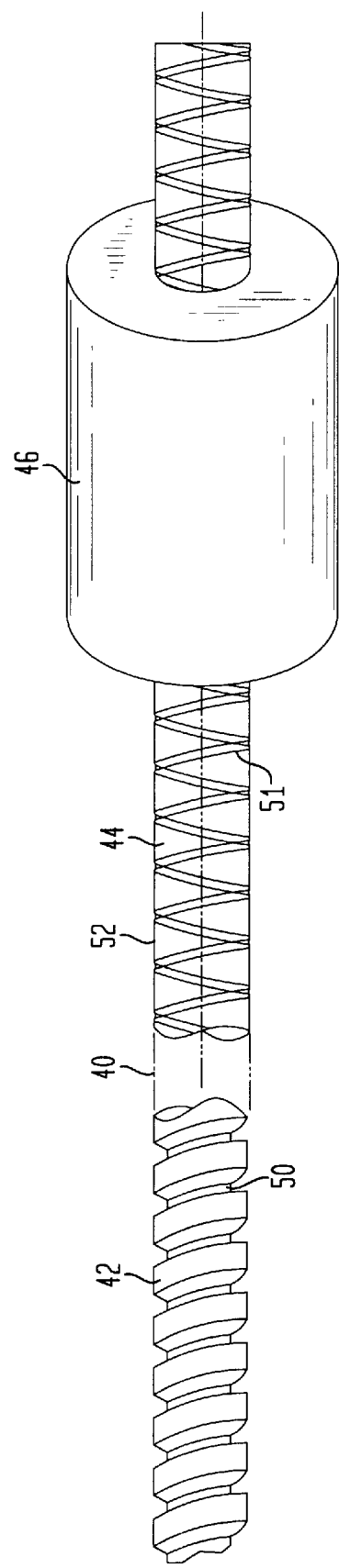
FIG. 5 is an isometric presentation of a motor shaft constructed in accordance with the invention showing a working surface region and a rotor surface region, there being additionally shown a permanent magnet rotor that has been adhered to the rotor surface region.

FIG. 5 is an isometric presentation of a motor shaft 40 constructed in accordance with the invention showing a working surface region 42 and a rotor surface region 44, there being additionally shown a permanent magnet rotor 46 that has been adhered to rotor surface region 44 by an adhesive 45. Working surface region 42 is shown in this specific illustrative embodiment of the invention to have a continuous helical groove 50 that is formed of multiple cutting passes using a cutter device, such as cutter tool 35 shown in FIG. 4. In the practice of a method aspect of the invention, the very first cutting pass is not limited to the working surface region of motor shaft 40, but instead is continued along rotor surface region 44 to form a shallow continuous helical groove 51. Continuous helical groove 51 is similar to continuous helical groove 33 described above with respect to FIGS. 3 and 4.

This method of preparing the shaft of a permanent magnet motor for adhesion to a permanent magnet rotor achieves the benefit of effecting a secure adhesion, particularly when a heat cured epoxy A+B (not shown) is employed, such as that which conforms to specification MM-A-132. In addition, helical region 52 between the turns of shallow continuous helical groove 51, remains at the original diameter of the motor shaft, thereby maintaining conformance to the original dimensional specifications of the shaft diameter. In this embodiment, permanent magnet rotor 46 is integrally cylindrical, and therefore is installed via the end of motor shaft 40. In other embodiments, however, the magnetic rotor is formed of magnetic segments, secured by the adhesive.

Although the invention has been described in terms of specific embodiments and applications, persons skilled in the art can, in light of this teaching, generate additional embodiments without exceeding the scope or departing from the spirit of the invention as set forth in the specification. Accordingly, it is to be understood that the drawing and description in this disclosure are proffered to facilitate comprehension of the invention, and should not be construed to limit the scope thereof.

What is claimed is:

1. A rotor for a permanent magnet motor, the rotor comprising: a rotor shaft having:

a working region for delivering mechanical energy; and a rotor region arranged coaxially with said working region, said rotor region having a rotor region surface having a rotor region continuous helical surface cut therein, the continuous helical cut having a depth of approximately between 0.001" and 0.004" into the rotor surface region; and a permanent magnet arrangement coupled by an adhesive to said rotor region of said rotor shaft for facilitating conversion of electromagnetic energy to mechanical energy, adhesion between said permanent magnet arrangement and the rotor region surface being enhanced by the rotor region continuous helical surface cut.

2. The rotor of claim 1, wherein the rotor region surface cut is a continuation of a working surface region cut.

3. The rotor of claim 2, wherein the working region of said rotor shaft has a threaded potion, and the working region surface cut is a first cut pass of the threaded portion of the working region of said rotor shaft.

* * * * *